United States Patent

Nishikawa

[11] Patent Number: 6,031,810
[45] Date of Patent: Feb. 29, 2000

[54] USING TWO LASER SOURCES ON A MAGNETO-OPTICAL RECORDING MEDIUM FOR PREVENTING LIGHT INTENSITY SHORTAGE

[75] Inventor: Koichiro Nishikawa, Takasaki, Japan

[73] Assignee: Canon Kabushiki Kaisha, Tokyo, Japan

[21] Appl. No.: 08/931,847

[22] Filed: Sep. 16, 1997

[30] Foreign Application Priority Data

Sep. 18, 1996 [JP] Japan .................................... 8-246256
Sep. 18, 1996 [JP] Japan .................................... 8-246257

[51] Int. Cl.[7] ................................................. G11B 11/00
[52] U.S. Cl. ........................ 369/121; 369/13; 369/44.23; 369/44.37; 369/44.32; 369/116
[58] Field of Search ............................. 369/121, 13, 110, 369/112, 44.37, 44.32, 116, 275.2, 100, 44.23

[56] References Cited

U.S. PATENT DOCUMENTS

| | | | |
|---|---|---|---|
| 5,270,987 | 12/1993 | Kaku et al. | 369/13 |
| 5,315,573 | 5/1994 | Nakao et al. | 369/100 |
| 5,353,274 | 10/1994 | Nishikawa | 369/121 |
| 5,357,493 | 10/1994 | Okazaki et al. | 369/13 |
| 5,463,610 | 10/1995 | Nishikawa | 369/121 |
| 5,557,601 | 9/1996 | Nishikawa | 369/121 |
| 5,586,097 | 12/1996 | Nishikawa | 369/112 |
| 5,657,305 | 8/1997 | Sasaki et al. | 369/110 |
| 5,784,345 | 7/1998 | Maeda et al. | 369/44.23 |

FOREIGN PATENT DOCUMENTS 6-290496   10/1994   Japan .

Primary Examiner—Tan Dinh
Assistant Examiner—Kim-Kwok Chu
Attorney, Agent, or Firm—Fitzpatrick, Cella, Harper & Scinto

[57] ABSTRACT

An optical information recording/reproducing apparatus records information on an optical information recording medium and/or reproduces the recorded information by irradiating a plurality of light spots on the recording medium. The apparatus includes a first light source for emitting a light beam with a wavelength $\lambda_1$, and a second light source for emitting a light beam with a wavelength $\lambda_2$. A light spot forming unit focuses the light beam with the wavelength $\lambda_1$ and the light beam with the wavelength $\lambda_2$ through an objective lens, and forms first and second light spots on the information recording medium. The following relations are substantially established: $1 \geq D_1/W_{1\perp} \geq 0.6$; $3.2 - 2.6 \times 1 n\alpha \geq D_2/W_{2\perp} \geq 1.0 - 1.2 \times 1 n\alpha$; and $\alpha = (\lambda_2/\lambda_1) \times (D_1/D_2)$. $D_1$ is the diameter of the light beam with the wavelength $\lambda_1$ which is incident on the objective lens for formation of the first light spot. $D_2$ is the diameter of the light beam with the wavelength $\lambda_2$ which is incident on the objective lens for formation of the second light spot. $W_{1\perp}$ and $W_{2\perp}$ are the diameters, in a direction corresponding to a track crossing direction of the information recording medium, of the light beams with the wavelengths $\lambda_1$ and $\lambda_2$, respectively, incident on the objective lens and forming the first and second light spots, respectively, which corresponds to $1/e^2$ a peak intensity of the light beam.

20 Claims, 10 Drawing Sheets

MEDIUM MOVING DIRECTION

MEDIUM MOVING DIRECTION

MEDIUM MOVING DIRECTION

USING TWO LASER SOURCES ON A MAGNETO-OPTICAL RECORDING MEDIUM FOR PREVENTING LIGHT INTENSITY SHORTAGE

BACKGROUND OF THE INVENTION

1. Field of the Invention

The present invention relates to an optical information recording/reproducing technique and, more particularly, to an optical information recording/reproducing apparatus for enlarging a magnetic domain by moving a magnetic wall using a heating light spot, and placing a reproducing light spot in the enlarged magnetic domain.

2. Related Background Art

In recent years, in optical information recording/reproducing apparatuses using optical information recording media such as magneto-optical disks, research and development on techniques of recording information at high densities and reproducing the information have been enthusiastically made. Conventionally, the size of a data mark bearing recorded information on an optical information recording medium has been limited by the diffraction limit of an optical system. Recently, however, optical information recording/reproducing methods in which the size of a data mark is not limited to the diffraction limit of an optical system have been proposed.

For example, in the method disclosed in Japanese Laid-Open Patent Application No. 6-290496, a magnetic domain is enlarged by moving a magnetic wall using a heating light spot, and a reproducing light spot is placed in the enlarged magnetic wall so as to reproduce the recorded information of a minute mark which is equal to or smaller in size than the resolution of an optical system, thereby realizing a recording medium with a high recording density.

FIG. 1 schematically shows the optical head optical system of the recording/reproducing apparatus disclosed in the above reference. As shown in FIG. 1, a heating laser is added to the optical system of a general magneto-optical disk recording/reproducing apparatus. Referring to FIG. 1, a recording/reproducing laser source 1 emits a laser beam with a wavelength of 780 nm. A heating laser source 2 emits a laser beam with a wavelength of 1.3 μm. A dichroic mirror 3 is designed to transmit 100% of 780-nm light and reflect 100% of 1.3-μm light. A polarizing beam splitter 4 is designed to transmit 70 to 80% of the P-polarized light of 780-nm light and 1.3-μm light and reflect 100% of the S-polarized light thereof. The diameter of a 1.3-μm light beam incident on an objective lens 5 is set to be smaller than the aperture of the objective lens 5 so that the NA with respect to the 1.3-μm light beam is smaller than the NA with respect to 780-nm light which passes through the entire aperture portion of the objective lens 5 to be focused. A dichroic mirror 7 is placed to prevent 1.3-μm light from leaking into the signal detection system. The dichroic mirror 7 is designed to transmit 100% of 780-nm light and reflect 100% of 1.3-μm light. FIG. 1 also shows a magneto-optical recording medium 6.

FIGS. 2A and 2B explain the operation of the recording/reproducing apparatus having the above optical head optical system. As shown in FIG. 2A, a recording/reproducing light spot 11 and a heating light spot 12 having a larger diameter than the recording/reproducing light spot 11 are formed on a land 15 between guide grooves 14, and the recording medium 6 is moved in the direction indicated by the arrow, thereby forming a temperature distribution like the one shown in FIG. 2B on the land 15. With this operation, a desired temperature gradient like the one shown in FIG. 2B is formed in an area within the recording/reproducing light spot 11 on the moving recording medium. An isothermal line 16 is an isothermal line of a temperature Ts. The magnetic layer of this recording medium is formed by sequentially stacking first, second, and third magnetic layers on each other. On this magnetic layer, a magnetic wall 13 is formed on the boundary portion between areas having atomic spins which are opposite in direction. When the magnetic wall 13 in the first magnetic layer is at a position Xs on the medium, since the temperature of the medium has already risen to the temperature Ts near the Curie temperature of the second magnetic layer at this position, the exchange coupling between the first and third magnetic layers is broken. As a result, the magnetic wall 13 in the first magnetic layer almost instantaneously moves to an area having a higher temperature (lower magnetic wall energy density).

When the magnetic wall 13 passes under the recording/reproducing light spot 11, all the atomic spins in the first magnetic layer within the light spot 11 are aligned in the same direction. Every time the magnetic wall 13 comes to the position Xs upon movement of the medium, the magnetic wall 13 instantaneously moves under the light spot, so that all the atomic spins within the light spot are reversed in direction and aligned in one direction. As a result, the reproduced signal amplitude remains constant and maximum regardless of the distances between recorded magnetic walls (i.e., the lengths of record marks).

The polarization plane of reflected light from the recording/reproducing light spot 11 is rotated by a magneto-optical effect. The reflected light reaches the polarizing beam splitter 4 through the objective lens 5. The S-polarized light component of the light is reflected by the polarizing beam splitter 4, and the resultant light is transmitted through the dichroic mirror 7 to be guided to the signal detection system.

In the above prior art, however, when a heating light spot is to be formed by simply using a long-wavelength light source and an objective lens with a small NA, a large loss of light occurs in a direction (track crossing direction) perpendicular to the track direction (medium moving direction) of a recording medium, a shortage of the light amount of the heating light spot 12 may occur.

In the prior art, when no heating light spot is to be used, the intensity of a recording/reproducing light spot is set to about 3 mW. When a heating light spot is to be used, the intensity of a recording/reproducing light spot is set to 1 mW. In a normal case, the intensity of a reproducing light spot is set to about 1 to 1.5 mW. The intensity density of a heating light spot is normally set to be about two to three times that of a recording light spot in the normal case.

In the above prior art, the heating light spot 12 is similar in shape to the almost isotropic recording/reproducing light spot 11, and has an outer diameter about four times that of the recording/reproducing light spot 11. When, therefore, the heating light spot 12 is almost equal in light amount to the recording/reproducing light spot 11, the intensity density of the heating light spot 12 is about 1/16 that of the recording/reproducing light spot 11. To obtain an intensity density about two to three times that of the recording/reproducing light spot 11, the intensity of the heating light spot 12 needs to be about 32 to 48 times that of the recording/reproducing light spot 11. Assume that the optical efficiency of a heating light emitting optical system is about two times that of a recording/reproducing light emitting optical system. In this case, the exit power of a heating light source must be about 16 to 24 times that of a recording/reproducing light source.

In general, the exit power of a reproducing light source is about 3 to 5 mW. In the above conventional apparatus, therefore, the exit power of the heating light source must be 48 to 120 mW. The exit power of the write light source in an optical disk apparatus is generally 35 to 50 mW. Under the circumstances, the possibility of a shortage of the light amount of a heating light spot is high.

In addition, since it is difficult to manufacture such a light source by using a high-output light source, a great increase in cost may occur.

SUMMARY OF THE INVENTION

The present invention has been made in consideration of the above situation, and has as its object to provide an optical information recording/reproducing apparatus which can effectively use the light amount for a heating light spot in an optical information recording/reproducing apparatus using the above reproduction principle by controlling the heating light spot in a form that prevents a loss of light in the track crossing direction, thereby realizing an excellent recording/reproducing operation without causing an increase in cost.

According to the present invention, in order to achieve the above object, an optical information recording/reproducing apparatus having the following arrangement is provided.

According to the present invention, there is provided an optical information recording/reproducing apparatus for recording information on an information recording medium and/or reproducing the recorded information by irradiating a plurality of light spots on the optical information recording medium, comprising:

a first light source for emitting a light beam with a wavelength $\lambda_1$;

a second light source for emitting a light beam with a wavelength $\lambda_2$; and light spot forming means for focusing the light beam with the wavelength $\lambda_1$ and the light beam with the wavelength $\lambda_2$ through an objective lens, and forming first and second light spots on the information recording medium, wherein the following relations are substantially established:

$1 \geq D_1/W_1 \geq 0.6$ $3.2 - 2.6 \times \ln\alpha \geq D_2/W_2 \geq 1.0 - 1.2 \times \ln\alpha$ $\alpha = (\zeta_2/\lambda_1) \times (D_1/D_2)$ where $D_1$ is a diameter of the light beam with the wavelength $\lambda_1$ passing through the objective lens for formation of the first light spot, $D_2$ is a diameter of the light beam with the wavelength $\lambda_2$ passing through the objective lens for formation of the second light spot, $W_1$ is a size of a component in a direction corresponding to a track crossing direction of the information recording medium, of the light beam with the wavelength $\lambda_1$ incident on the objective leans and forming the first light spot, which corresponds to $1/e^2$ a peak intensity of the light beam, and $W_2$ is a size of a component in a direction corresponding to the track crossing direction of the information recording medium, of the light beam with the wavelength $\lambda_2$ incident on the objective leans and forming the second light spot, which corresponds to $1/e^2$ a peak intensity of the light beam.

In the optical information recording/reproducing apparatus of the present invention, the information recording medium is a magnetic wall movement magneto-optical recording medium, and the second light spot is used to move magnetic walls associated with recorded information on the information recording medium so as to enlarge a magnetic domain enclosed with the magnetic walls and place the magnetic domain within the first light spot, thereby reproducing the recorded information with the first light spot.

In the optical information recording/reproducing apparatus of the present invention, a polarizing direction of the light beam forming the second light spot optically corresponds to a track direction of the information recording medium.

In the optical information recording/reproducing apparatus of the present invention, the first light spot is used to reproduce recorded information from the information recording medium, and the second light spot is used to heat the information recording medium.

In the optical information recording/reproducing apparatus of the present invention, the following relations are substantially established:

$2.4 - 1.9 \times \ln\alpha \geq D_2/W_2 \geq 1.5 - 1.6 \times \ln\alpha$ $\alpha = (\lambda_2/\lambda_1) \times (D_1/D_2)$ When the above relations are substantially established, the first light spot is used to record/erase information on/from the information recording medium and reproduce the recorded information, and the second light spot is used to heat the information recording medium.

In the optical information recording/reproducing apparatus of the present invention, a relation of $D_1 \geq D_2$ is established.

In the optical information recording/reproducing apparatus of the present invention, the light beams from the first and second light sources are synthesized by light beam separating/synthesizing means, and the synthesized light is focused by the objective lens.

In this case, a wavelength of the light beam from the first light source differs from a wavelength of the light beam from the second light source, and the light beam separating/synthesizing means is a dichroic mirror, and a second collimator lens is disposed between the second light source and the light beam separating/synthesizing means.

In addition, in this case, a polarizing beam splitter is disposed between the first light source and the light beam separating/synthesizing means, a reflected light beam from the first light spot is separated from the light source from the first light source by the polarizing beam splitter to be guided to a signal detection system, and a first collimator lens is disposed between the second light source and the polarizing beam splitter.

In the optical information recording/reproducing apparatus of the present invention, the first and second light sources are semiconductor lasers.

In the optical information recording/reproducing apparatus of the present invention, a far field pattern of the second light source has a shape elongated in a direction corresponding to the track crossing direction of the information recording medium.

In the optical information recording/reproducing apparatus of the present invention, a relation of $\lambda_1 < \lambda_2 < 1.4 \times \lambda_1$ is further established.

In the optical information recording/reproducing apparatus of the present invention, the following relations are substantially established:

$2.0 - 1.49 \times \ln\alpha \geq D_2/W_2 \geq 1.0 - 1.2 \times \ln\alpha$ $\alpha = (\lambda_2/\lambda_1) \times (D_1/D_2)$ With regard to the above relations, the following relations are further preferably satisfied:

$1.5 - 1.49 \times \ln\alpha \geq D_2/W_2 \geq 1.3 - 0.89 \times \ln\alpha$ $\alpha = (\lambda_2/\lambda_1) \times (D_1/D_2)$ When the above relations are substantially established, the first light spot is used to reproduce recorded information from the information recording medium, and the second light spot is used to record/erase information on/from the information recording medium and heat the information recording medium.

In this case, when information is to be recorded/erased on/from the information recording medium by using the second light spot, the first light spot is used to read format information and servo information about the first light spot.

In addition, in this case, when recorded information is to be reproduced from the information recording medium by using the first light spot, the first light spot is used to read servo information about the first light spot.

DETAILED DESCRIPTION OF THE PREFERRED EMBODIMENTS

The embodiments of the present invention will be described below with reference to the accompanying drawings.

An embodiment using an information recording (erasing)/reproducing semiconductor laser and a heating semiconductor laser will be described first.

Figure 3A:
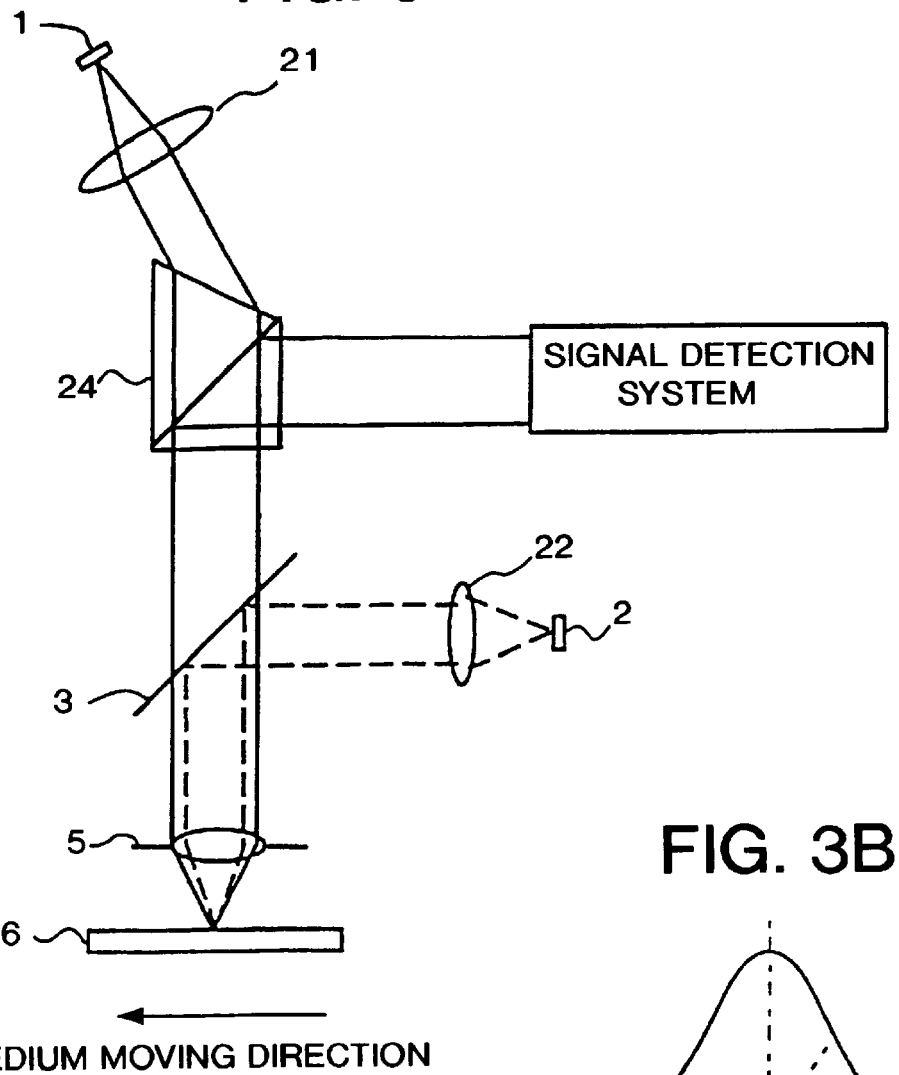
FIG. 3A is a schematic view showing the optical head of an optical information recording/reproducing apparatus according to the first embodiment of the present invention.

FIG. 3A is a schematic view showing the optical head of an optical information recording/reproducing apparatus according to the first embodiment of the present invention. An information recording (erasing)/reproducing semiconductor laser 1 emits a laser beam with a wavelength $\lambda_1$ (e.g., 680 nm). A heating semiconductor laser 2 emits a laser beam with a wavelength $\lambda_2$ (e.g., 780 nm). A dichromic mirror 3 is designed to transmit 100% of light with the wavelength $\lambda_1$ and reflect 100% of light with the wavelength $\lambda_2$. A polarizing beam splitter 24 has a beam shaping function and is designed to transmit 70 to 80% of the P-polarized light of light with the wavelength $\lambda_1$ and 100% of reflect the S-polarized light thereof.

Figure 1:
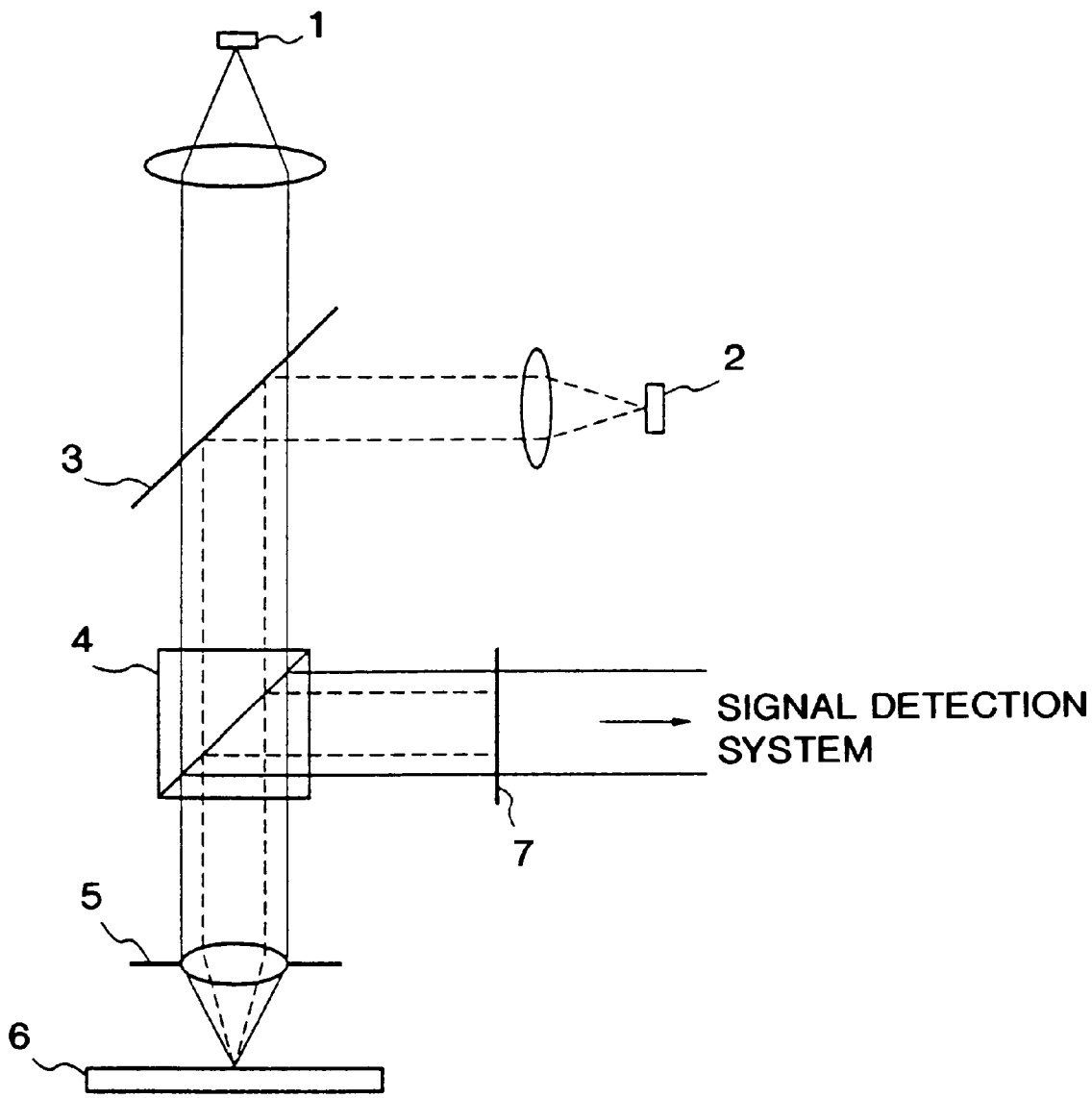
FIG. 1 is a schematic view showing the optical head optical system of a conventional recording/reproducing apparatus.
Figure 2A:
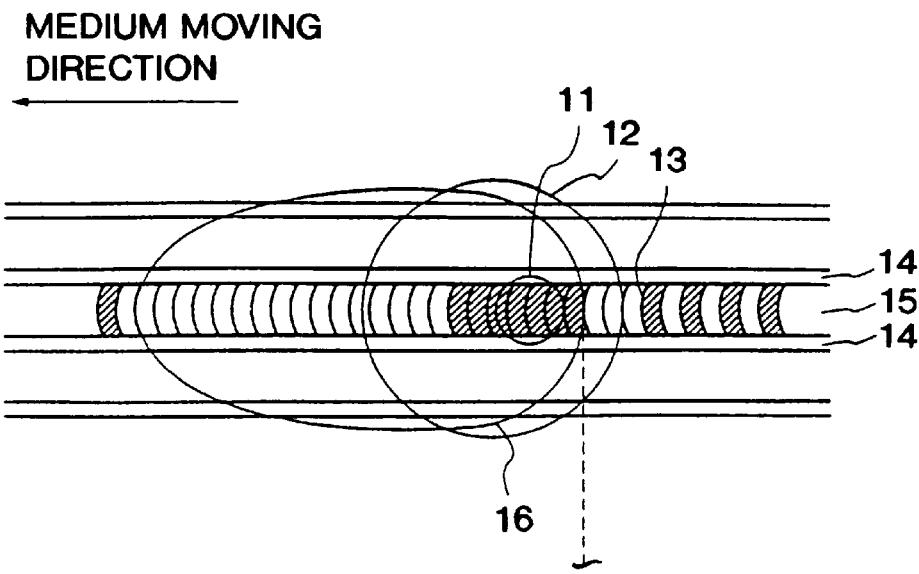
FIGS. 2A and 2B are views for explaining the operation of the conventional recording/reproducing apparatus.
Figure 2B:
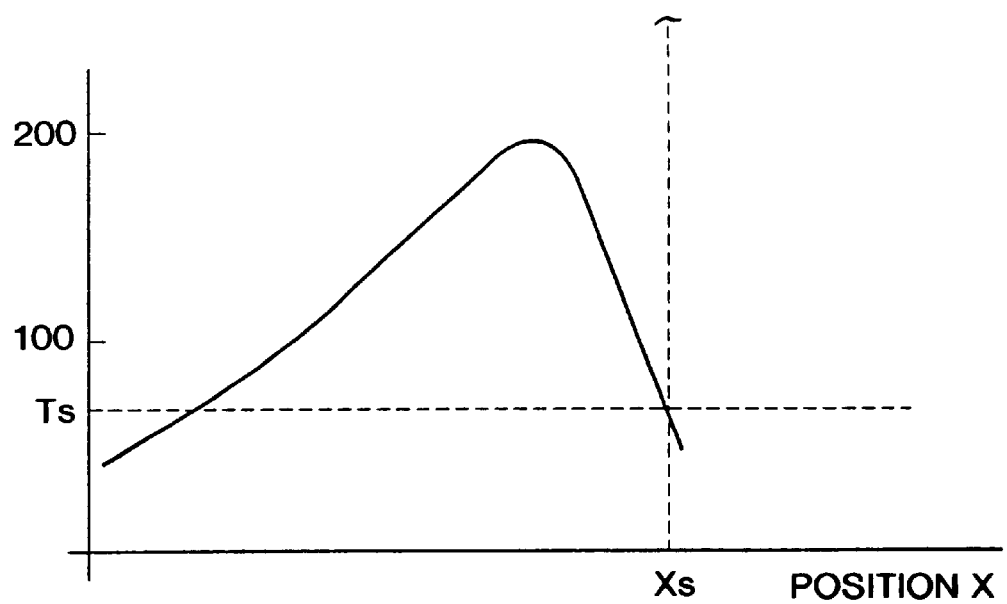

The laser beams emitted from the semiconductor lasers 1 and 2 have a polarization plane direction that causes the laser beams to be incident as P-polarized light on the polarizing beam splitter 24 and the dichromic mirror 3. The polarizing direction of this light corresponds to the track direction of a magneto-optical recording medium 6. As the magneto-optical recording medium 6, a magnetic wall movement magneto-optical recording medium like the one described with reference to FIGS. 2A and 2B is used.

The focal length of a collimator lens 21 is 6 mm. The effective diameter and NA of an objective lens 5 are 3.3 mm and 0.55, respectively. The beam shaping ratio of the polarizing beam splitter 24 having the beam shaping function is about 2.0. The wavelength $\lambda_1$ of the semiconductor laser 1 is 680 nm. A far field pattern is formed by the semiconductor laser 1 such that the full angle at half maximum (θ) in the polarizing (P-polarizing) direction (corresponding to the track direction of the recording medium) is 11°, and the full angle at half maximum (θ') in a direction perpendicular to the polarizing direction is 22°. The recording/reproducing light spot formed by this recording/reproducing light emitting optical system is almost isotropical and has a diameter of about 1.1 μm.

The characteristics of a heating light emitting optical system including the heating semiconductor laser 2 and a collimator lens 22 are set as follows.

Figure 4:
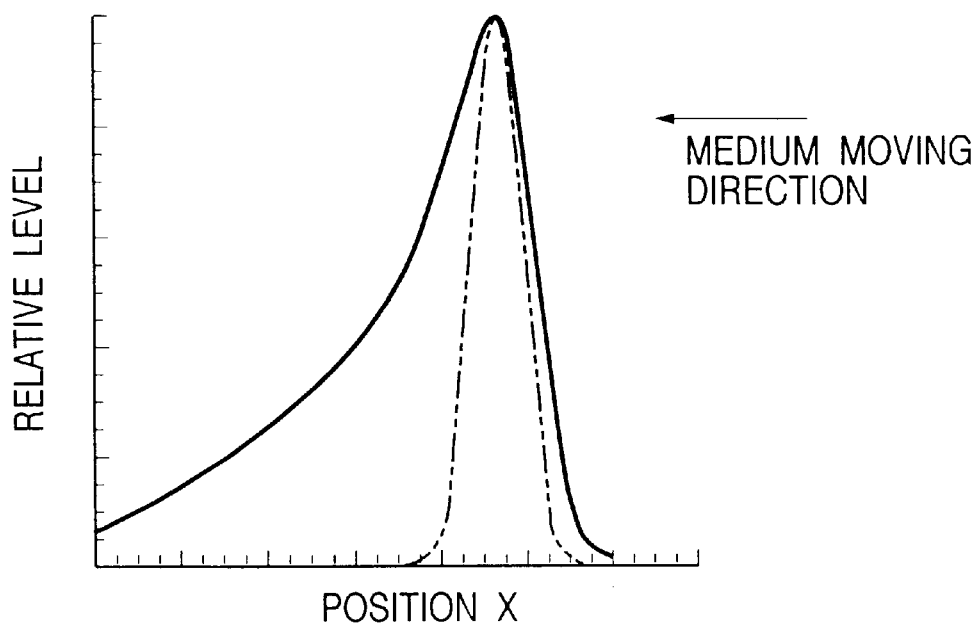
FIG. 4 is a graph showing a comparison between the temperature profile of a recording medium and the form of the incident intensity distribution of a heating light spot.

The spot size of a laser beam required when it is used as a heating laser beam will be described first. FIG. 4 shows the relationship between the intensity distribution of light incident on the moving (rotating) magneto-optical recording medium 6 and the temperature distribution formed thereon, when viewed from a cross section in the track direction. Referring to FIG. 4, the solid line represents the temperature distribution; and the dotted line, the intensity distribution. As is obvious from FIG. 4, the temperature distribution on the back side in the medium moving direction is similar in profile to the incident light intensity distribution. To form a temperature gradient such that the directions of atomic spins in the magnetic layer are aligned within a reproducing light spot upon movement of a magnetic wall, a recording/reproducing light spot must fit in at least the gradient temperature distribution on the back side in the medium moving direction. With regard to the spread of the temperature distribution on the back side in the medium moving direction, it suffices if a relation of (heating light spot diameter/2)≧ recording/reproducing light spot diameter is substantially established. With this arrangement, a recording/reproducing light spot can be located within the slope (gradient), of the temperature distribution obtained by a heating light spot, which is on the back side in the medium moving direction, so that the directions of atomic spins (corresponding to the magnetizing directions) in the magnetic layer which contribute to reproduction and are located within the recording/reproducing light spot can be aligned upon movement of a magnetic wall. In this manner, the magnetic wall serving for the formation of recorded information on the magneto-optical recording medium 6 is moved by a heating light spot to enlarge the magnetic domain enclosed with the magnetic walls, thereby placing only the single magnetic domain within a reproducing light spot.

Note that the intensity distribution of the light emitted from a semiconductor laser is generally set such that the ratio of the full angle at half maximum in the polarizing direction to the full angle at half maximum in a direction perpendicular to the polarizing direction is ⅓ to ½.

Figure 3B:
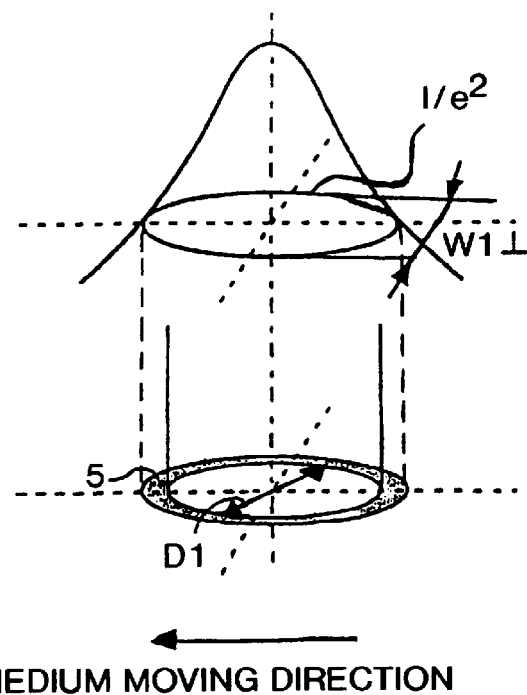
FIG. 3B is a schematic diagram showing an enlarged view of FIG. 3A, near an objective lens designated by reference number 5.

A recording/reproducing light beam is beam-shaped and vignetted by the collimator lens 21 to almost eliminate the influence of the above full angle at half maximum ratio. The resultant light beam is incident as an almost isotropical (circular) light beam on the objective lens 5. Letting $W_1$ be the diameter of a component, of the recording/reproducing light beam incident on the objective lens 5, which has an intensity equal to or higher than $1/e^2$ the peak value of the intensity distribution of the recording/reproducing light beam (in a semiconductor laser, the diameter in the polarizing direction differs from that in a direction perpendicular to the polarizing direction, but the diameters in the two directions become almost equal to each other upon beam shaping), and $D_1$ be the diameter of a light beam passing through the objective lens 5 (captured by the objective lens 5), $D_1/W_1$ is 1.0 or less and 0.6 or more. Since the recording/reproducing light beam is beam-shaped, the light beam captured by the objective lens 5 has a circular shape, and the diameters of light polarization components in the track direction and the track crossing direction, of the light beam incident on the objective lens 5, which correspond to $1/e^2$ the peak intensity thereof are almost equal to each other. Therefore, $D_1/W_1 = D_1/W_{1\perp}$. $W_{1\perp}$ is the diameter in the track crossing direction of the light beam component that corresponds to $1/e^2$ of the peak intensity of the light beam. (See FIG. 3B.)

A heating light beam is not beam-shaped, and the vignetting of the beam by the collimator lens 22 is minimized. This light beam has a circular shape. The heating light beam is captured by the objective lens 5, reflecting the intensity distribution of the above full angle at half maximum ratio. In this case, if the polarizing direction of the light beam is set to be parallel to the track direction of the magneto-optical recording medium, a light spot having an elliptic shape elongated in the track direction is obtained. With this arrangement, effective use of light can be realized in terms of the light amount in a direction (track crossing direction) perpendicular to the track direction. Since the heating light beam is not beam-shaped, although the light beam captured by the objective lens 5 has a circular shape, the diameters of light components in the track direction and the track crossing direction, of the light beam incident on the objective lens 5, which correspond to $1/e^2$ the peak intensity thereof differ from each other.

Figure 5:
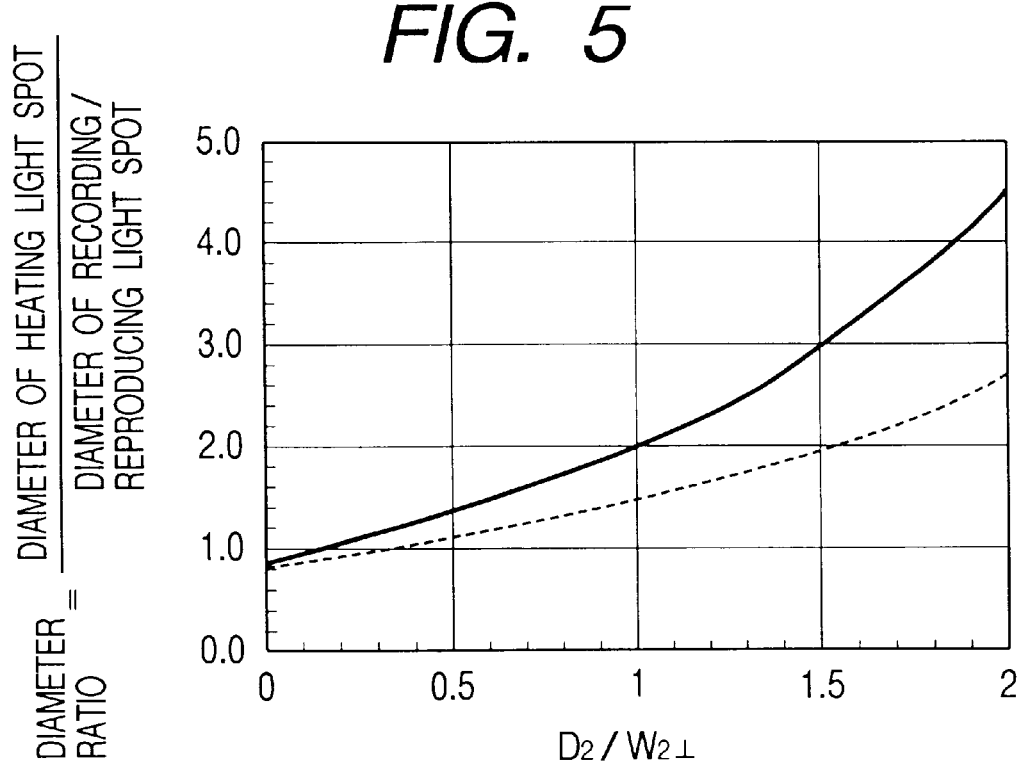
FIG. 5 is a graph showing changes in the diameter of a heating light spot in the track crossing direction with changes in $D_2/W_{2\perp}$ with respect to a recording/reproducing spot.

FIG. 5 shows the diameter of a heating light spot in a direction parallel to the track direction with respect to the diameter of an isotropical recording/reproducing light spot in the direction parallel to the track direction which is obtained when $D_1/W_1 \cong 0.85$. In this case, the spot diameter is indicated by the ratio of the diameter of the heating light spot to the diameter of the recording/reproducing light spot with respect to $D_1/W_1 \cong 0.85$. Referring to FIG. 5, the solid line represents the spot diameter when the full angle at half maximum ratio of the heating semiconductor laser is ⅓; the dotted line, the spot diameter when the full angle at half maximum ratio is ½. At a spot diameter ratio of 2, $D_2/W_{2\perp} \cong 1.0$ (referring to FIG. 5, the sign of perpendicularity of $D_2/W_{2\perp}$ indicates that the ratio corresponds to that in a direction perpendicular to the track direction; the same applies to the following description) when the full angle at half maximum ratio is ⅓, and $D_2/W_{2\perp} \cong 1.5$ when the full angle at half maximum ratio is ½. No problem is therefore posed in terms of the size of a heating light spot when $D_2/W_{2\perp}$, is 1.0 or more, and preferably 1.5 or more.

The optical efficiency of the recording/reproducing light emitting optical system, in which light emitted from the semiconductor laser 1 passes through the collimator lens 21, the polarizing beam splitter 24, and the objective lens 5, is about 30 to 40% like a general magneto-optical head. In contrast to this, the optical efficiency of the heating light emitting optical system, in which light emitted from the semiconductor laser 2 passes through the collimator lens 22 and the objective lens 5, can be set to be about 60 to 80%, i.e., about two to three times that of the recording/reproducing light emitting optical system, because no polarizing beam splitter for beam shaping is present, and substantially only the vignetting at the collimator lens 22 causes a loss of light, which can be relatively small.

Consider the intensity of light required on a recording medium. The recording power is about six to ten times the reproducing power. As described above, the heating power is about two to three times the reproducing power. Since a light source is limited by the recording power, the heating light source may have the same specifications as those of the light source for a magneto-optical disk, and the optical efficiency may be about ¼ to ⅓. The intensity density of a heating light spot is therefore about two to three times that of a reproducing light spot. If the diameter of the heating light spot is increased by the optical efficiency margin, the area of the light spot can be increased to six to ten times that of the reproducing light spot.

Figure 6:
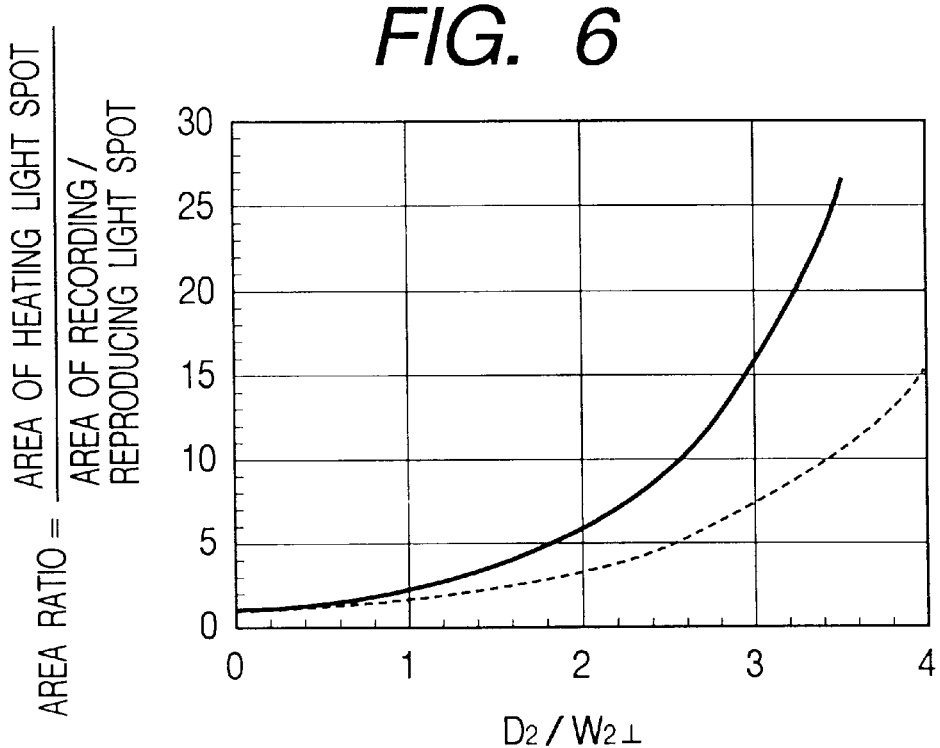
FIG. 6 is a graph showing changes in the ratio of the area of a heating light spot to that of a recording/reproducing light spot with changes in $D_2/W_{2\perp}$.

FIG. 6 shows the area of a heating light spot with respect to the isotropical recording/reproducing light spot obtained when $D_1/W_1 \cong 0.85$. In this case, the spot area is indicated by the ratio of the area of the heating light spot to the area of the recording/reproducing light spot with respect to that set when $D_1/W_1 \cong 0.85$. Referring to FIG. 6, the solid line represents the spot area obtained when the full angle at half maximum ratio of the heating semiconductor laser is ⅓; the dotted line, the spot area obtained when the full angle at half maximum ratio is ½. At a spot area ratio of 8, $D_2/W_{2\perp} \cong 2.4$ when the full angle at half maximum ratio is ⅓, and $D_2/W_{2\perp} \cong 3.3$ when the full angle at half maximum ratio is ½. No problem is therefore posed in terms of the intensity density of a heating light spot when $D_2/W_{2\perp}$ is 3.3 or less, and preferably 2.4 or less.

As described above, to form a temperature gradient such that a necessary amount of light can be ensured without causing any loss in light in the track crossing direction, and the directions of atomic spins in the magnetic layer are aligned within a recording/reproducing light spot upon movement of a magnetic wall, a heating light spot may be formed such that the polarizing direction is parallel to the track direction of the recording medium, and $3.3 \geq D_2/W_{2\perp} \geq 1.0$, and preferably $2.4 \geq D_2/W_{2\perp} \geq 1.5$, where $D_2$ is the diameter of the light beam forming the heating light spot in the track crossing direction when it passes through the objective lens, and $W_{2\perp}$ is the diameter in the track crossing direction of a component, of the light beam incident on the objective lens, which corresponds to $1/e^2$ the peak intensity of the incident light beam.

These conditions are set when the specifications of the recording/reproducing light source are the same as those of the heating light source. In the arrangement shown in FIG. 3, a heating light beam is separated/synthesized from/with a recording/reproducing light beam by the dichromic mirror 3, and $\lambda_1 \neq \lambda_2$. To obtain a large light spot as a heating light spot, $\lambda_1 < \lambda_2$ is preferably satisfied, and more preferably $\lambda_1 < \lambda_2 < 1.4 \times \lambda_1$. Letting $D_1$ be the diameter of the reproducing light beam captured by the objective lens 5, and $D_2$ be the diameter of the heating light beam captured by the objective lens 5, $D_1 > D_2$ is preferable to $D_1 = D_2$. In this case, the effective NA of the objective lens is proportional to $D_1$ and $D_2$. With respect to the diameter of a recording/reproducing light spot, therefore, diameter of heating light spot ≅ (diameter of recording/reproducing light spot)×$(\lambda_2/\lambda_1) \times (D_1/D_2)$. That is, a factor $\alpha = [(\lambda_2/\lambda_1) \times (D_1/D_2)]$ is plotted on the ordinate in FIG. 5, and a factor $\alpha^2$ is plotted on the ordinate in FIG. 6 because it represents an area.

Figure 7:
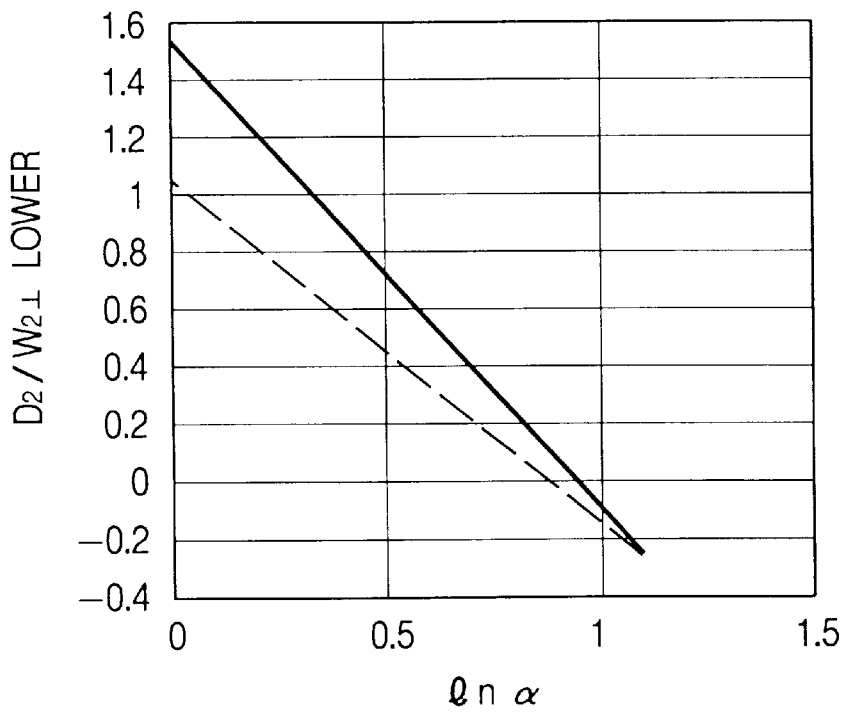
FIG. 7 is a graph showing changes in the lower limit value of $D_2/W_{2\perp}$.
Figure 8:
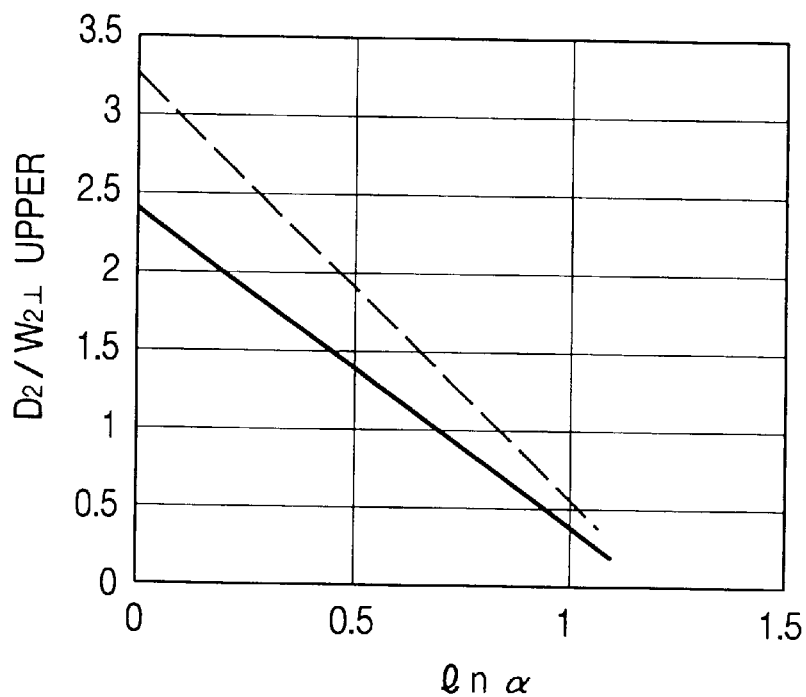
FIG. 8 is a graph showing changes in the upper limit value of $D_2/W_{2\perp}$.

The parameter "$D_2/W_{2\perp}$" determines the intensity distribution of a light beam captured by the objective lens (passing through the objective lens) as an argument of an exponential function. The intensity distribution of the spot formed by the objective lens is determined by the intensity distribution of the light beam captured by the objective lens, and is almost an exponential function because the Fourier transform of an exponential function is an exponential function. The factors $\alpha$ and $\alpha^2$ are therefore associated with the parameter "$D_2/W_{2\perp}$" in the form of natural logarithms having $\alpha$ and $\alpha^2$ as arguments; $\log_e \alpha = \ln \alpha$. FIG. 7 shows $D_2/W_{2\perp}$ ("D/Wlower" indicating its lower limit) in the track crossing direction under the condition of (diameter of heating light spot/2)=diameter of recording/reproducing light spot with $\ln \alpha$ being a variable. When the full angle at half maximum ratio of the heating semiconductor laser is ½ (dotted line), $D_2/W_{2\perp}$ lower ≅ $-1.18 \times \ln\alpha + 1.03$ When the full angle at half maximum ratio is ⅓ (solid line), $D_2/W_{2\perp}$ lower ≅ $-1.61 \times \ln\alpha + 1.52$ FIG. 8 shows $D_2/W_{2\perp}$ ("$D/W_{2\perp}$upper" indicating its upper limit) in the track crossing direction under the condition that the ratio becomes eight in terms of spot area with $\ln\alpha$ being a variable. When the full angle at half maximum ratio of the heating semiconductor laser is ½ (dotted line), D/Wupper ≅ $-2.59 \times \ln\alpha + 3.18$ When the full angle at half maximum ratio is ⅓ (solid line), D/Wupper ≅ $-1.93 \times \ln\alpha + 2.36$ As described above, to form a temperature gradient such that a necessary amount of light can be ensured without causing any loss in light in the track crossing direction, and the directions of atomic spins in the magnetic layer are aligned within a recording/reproducing light spot upon movement of a magnetic wall, a light beam forming a heating light spot is emitted such that the polarizing direction becomes parallel to the track direction of the magneto-optical recording medium 6, and the following relations are substantially satisfied:

$3.2 - 2.6 \times \ln\alpha \geq D_2/W_2 \geq 1.0 - 1.2 \times \ln\alpha$ preferably $2.4 - 1.9 \times \ln\alpha \geq D_2/W_2 \geq 1.5 - 1.6 \times \ln\alpha$ where $D_2$ is the diameter of the light beam forming the heating light spot in the track crossing direction which passes through the objective lens, and $W_2$ is the diameter of the light beam incident on the objective lens.

The heating laser 2 and the collimator lens 22 of the optical system in FIG. 3 were selected on the basis of the above conditions. The following are examples of the numerical values. The wavelength $\lambda_2$ of the heating laser 2 is 780 nm. The focal length of the collimator lens 22 is represented by $f_{col}$. Not that when the diameter $D_2$ was larger than the effective diameter of the objective lens 5, the diameter $D_2$ was regarded as equal to the effective diameter of the objective lens 5.

EXAMPLE 1

$\theta = 12°$ $\theta' = 24°$ $f_{col} = 6$ mm $D_1 = 1.65$ mm $D_1/W_{1\perp} \cong 0.85$ $D_2 = 1.65$ mm $W_2 = 1.07$ mm $D_2/W_2, = \mathbf{1.55}$ spot diameter ratio in track direction=3.6 spot diameter ratio in track crossing direction=1.3 spot area ratio=3.0

EXAMPLE 2

$\theta = 9°$ $\theta' = 27°$ $f_{col} = 6$ mm $D_1 = 1.65$ mm $D_1/W_{1\perp} \cong 0.85$ $D_2 = 1.65$ mm $W_{2\perp} = 0.80$ mm $D_2/W_{2\perp} = 2.06$ spot diameter ratio in track direction=3.2 spot diameter ratio in track crossing direction=1.6 spot area ratio=7.7

EXAMPLE 3

$\theta = 12°$ $\theta' = 24°$ $f_{col} = 7$ mm $D_1 = 1.65$ mm $D_1/W_{1\perp} \cong 0.85$ $D_2 = 1.49$ mm $W_{2\perp} = 1.24$ mm $D_2/W_{2\perp} = 1.19$ spot diameter ratio in track direction=2.9 spot diameter ratio in track crossing direction=1.3 spot area ratio=3.2

EXAMPLE 4

$\theta=9°$ $\theta'=27°$ $f_{col}=7$ mm $D_1=1.65$ mm $D_1/W_{1\perp} \approx 0.85$ $D_2=1.49$ mm $W_{2\perp}=0.93$ mm $D_2/W_{2\perp}=1.59$ spot diameter ratio in track direction=2.6 spot diameter ratio in track crossing direction=1.5 spot area ratio=5.7

According to Examples described above, the diameter of the heating light spot in the track crossing direction is 1.3 to 1.6 times that of the recording/reproducing light spot, and the diameter of the heating light spot in the polarizing direction is equal to or larger than two times that of the recording/reproducing light spot. In consideration of these numerical values, almost no loss in light occurs. In addition, since the diameter of the heating light spot in the polarizing direction (track direction) is 2.6 to 3.6 times that of the recording/reproducing light spot, a temperature gradient for magnetic wall movement reproduction can be satisfactorily formed. Furthermore, the area of the heating light spot is 3.7 to 7.7 that of the recording/reproducing light spot. With this spot area, the light amount required for a heating light spot can be satisfactorily ensured.

As described above, according to the present invention, in an apparatus for reproducing a minute record mark by moving a magnetic wall using a heating light spot so as to align the directions of atomic spins in the magnetic layer within a recording/reproducing spot, optical system parameters are set within predetermined ranges to effectively use the light amount of a heating light spot and prevent a loss of light in the track crossing direction, thereby realizing a good recording/reproducing operation without any increase in cost.

An embodiment using a reproducing semiconductor laser and an information recording (erasing)/heating semiconductor laser will be described next.

Figure 9:
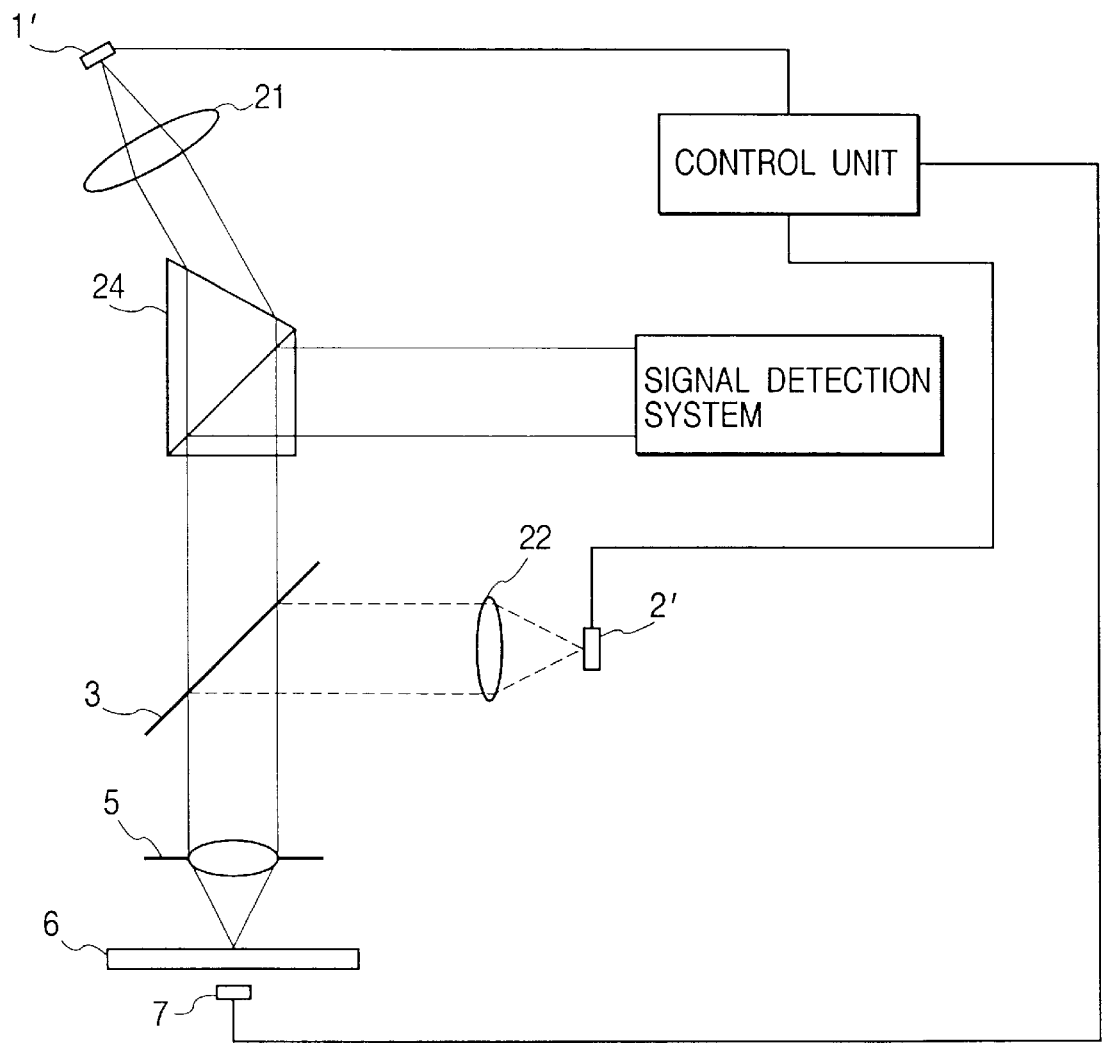
FIG. 9 is a view showing the schematic arrangement of an optical information recording/reproducing apparatus according to the second embodiment of the present invention.

FIG. 9 is a schematic view showing the arrangement of an optical information recording/reproducing apparatus according to the second embodiment of the present invention. A reproducing semiconductor laser 1' emits a laser beam with a wavelength of 680 nm. An information recording (erasing)/heating semiconductor laser 2' emits a laser beam with a wavelength of 780 nm. A dichromic mirror 3 is designed to transmit 100% of 680-nm light and reflect 100% of 780-nm light. A polarizing beam splitter 24 has a beam shaping function and is designed to transmit 70 to 80% of the P-polarized light of 680-nm light and reflect 100% of the S-polarized light thereof.

The laser beams emitted from the semiconductor lasers 1' and 2' have a polarization plane direction that causes the laser beams to be incident as P-polarized light on the polarizing beam splitter 24 and the dichromic mirror 3. The polarizing direction of this light corresponds to the track direction of a magneto-optical recording medium 6.

The focal length of a collimator lens 21 is 6 mm. The effective diameter and NA of an objective lens 5 are 3.3 mm and 0.55, respectively. The beam shaping ratio of the polarizing beam splitter 24 having the beam shaping function is about 2.0. A far field pattern is formed by the semiconductor laser 1' such that the full angle at half maximum ($\theta$) in the polarizing (P-polarizing) direction (corresponding to the track direction of the recording medium) is 11°, and the full angle at half maximum ($\theta'$) in a direction perpendicular to the polarizing direction is 22°.

The characteristics of a heating/recording light emitting optical system including the heating/recording semiconductor laser 2' and a collimator lens 22 are set as follows.

In the optical system shown in FIG. 9, the optical efficiency of the reproducing light emitting optical system, in which the light emitted from the semiconductor laser 1' passes through a collimator lens 21, the polarizing beam splitter 24, and the objective lens 5, is generally about 30 to 60%.

In the heating/recording light emitting optical system including the semiconductor laser 2 and the collimator lens 22, a large spot size is required because a light spot is used as a heating light spot. A relatively large spot is therefore obtained by setting a relatively large ratio $D_2/W_{2\perp}$ where $D_2$ is the diameter of a light beam, of the light beam emitted from the semiconductor laser 2', which passes through the objective lens 5, and $W_{2\perp}$ is the size of a light component in a direction optically corresponding to the track crossing direction (a recording medium in-plane direction perpendicular to the track direction), of the light beam emitted from the semiconductor laser 2' and incident on the objective lens 5, which has an intensity equal to or higher than $1/e^2$ the peak intensity of the light beam.

In general, wavelength separation can be satisfactorily performed near a wavelength of 600 to 800 nm when the wavelength difference is 50 nm (100 nm in consideration of a margin). In this embodiment, therefore, the wavelength ($\lambda_1$) of the reproducing laser 1' is set to 680 nm, and the wavelength ($\lambda_2$) of the heating laser 2' is set to 780 nm. The maximum rated value of the output of a long-wavelength laser can be 1.4 to 2.0 times that of a short-wavelength laser because the long-wavelength laser is easier to manufacture. For example, a semiconductor laser capable of a recording operation has a maximum rated value of 35 mW for a wavelength of 680 nm; and 50 to 70 mW for a wavelength of 780 nm.

With regard to the intensity distribution of light emitted from a semiconductor laser, the ratio of the full angle at half maximum in the polarizing direction to the full angle at half maximum in a direction perpendicular to the polarizing direction is generally ⅓ to ½.

A reproducing light beam is beam-shaped and vignetted by the collimator lens 21 to almost eliminate the influence of the above full angle at half maximum ratio. The resultant light beam is incident as an almost isotropical (circular) light beam on the objective lens 5. Letting $W_1$ be the diameter of a component, of the reproducing light beam incident on the objective lens 5, which has an intensity equal to or higher than $1/e^2$ the peak value of the intensity distribution of the reproducing light beam (in a semiconductor laser, the diameter in the polarizing direction differs from that in a direction perpendicular to the polarizing direction, but the diameters in the two directions become almost equal to each other upon beam shaping), and $D_1$ be the diameter of a light beam passing through the objective lens 5 (captured by the objective lens 5), $D_1/W_1$ is 1.0 or less and 0.6 or more. Since the reproducing light beam is beam-shaped, the light beam captured by the objective lens 5 has a circular shape, and the diameters of light components in the track direction and the track crossing direction, of the light beam incident on the objective lens 5, which correspond to $1/e^2$ the peak intensity thereof are almost equal to each other. Therefore, $D_1/W_1=D_1/W_{1\perp}$.

A heating light beam is not beam-shaped, and the vignetting of the beam by the collimator lens 22 is minimized. This light beam has a circular shape. The heating light beam is captured by the objective lens 5, reflecting the intensity distribution of the above full angle at half maximum ratio. In this case, if the polarizing direction of the light beam is set to be parallel to the track direction of the magneto-optical recording medium, a light spot having an elliptic shape elongated in the track direction is obtained. With this arrangement, effective use of light can be realized in terms of the light amount in a direction (track crossing direction) perpendicular to the track direction.

Figure 10:
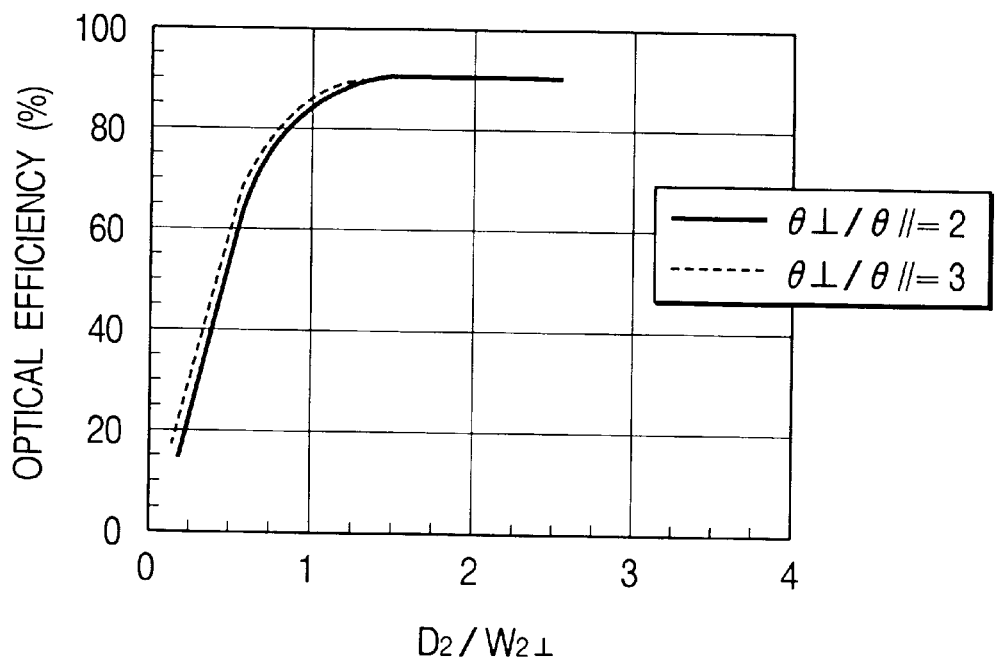
FIG. 10 is a graph showing changes in the optical efficiency of a heating light emitting optical system with changes in $D_2/W_{2\perp}$.

FIGS. 6 and 10 show the spot size and optical efficiency with a ratio $D_2/W_{2\perp}$, as a variable, where $D_2$ is the diameter of a light beam, of the light beam from the heating semiconductor laser 2', which passes through the objective lens 5, and $W_{2\perp}$ is the size of a component in a direction optically corresponding to the track crossing direction, of the light beam emitted from the semiconductor laser 2' and incident on the objective lens 5, which has an intensity equal to or higher than $1/e^2$ the peak intensity of the light beam. In this case, the size of the heating light spot is indicated by the ratio of the area of the heating light beam to the area of the reproducing light beam (the light beam forming the isotropical spot after beam shaping) with respect to $D_1/W_1 \cong 0.85$. Referring to FIGS. 6 and 10, the solid lines correspond to $\theta'/\theta \cong 2$ (semiconductor laser 2'), and the dotted lines correspond to $\theta'/\theta \cong 3$ (the parallel sign is added to $\theta$ indicates that the value corresponds to a direction parallel to the track direction, and the perpendicular sign is added to $\theta'$ to indicate that the value corresponds to a direction perpendicular to the track direction; the same applies to the following description). As is obvious from FIG. 10, the optical efficiency is high with $D_2/W_{2\perp} \cong 0.7$ or more.

Figure 11:
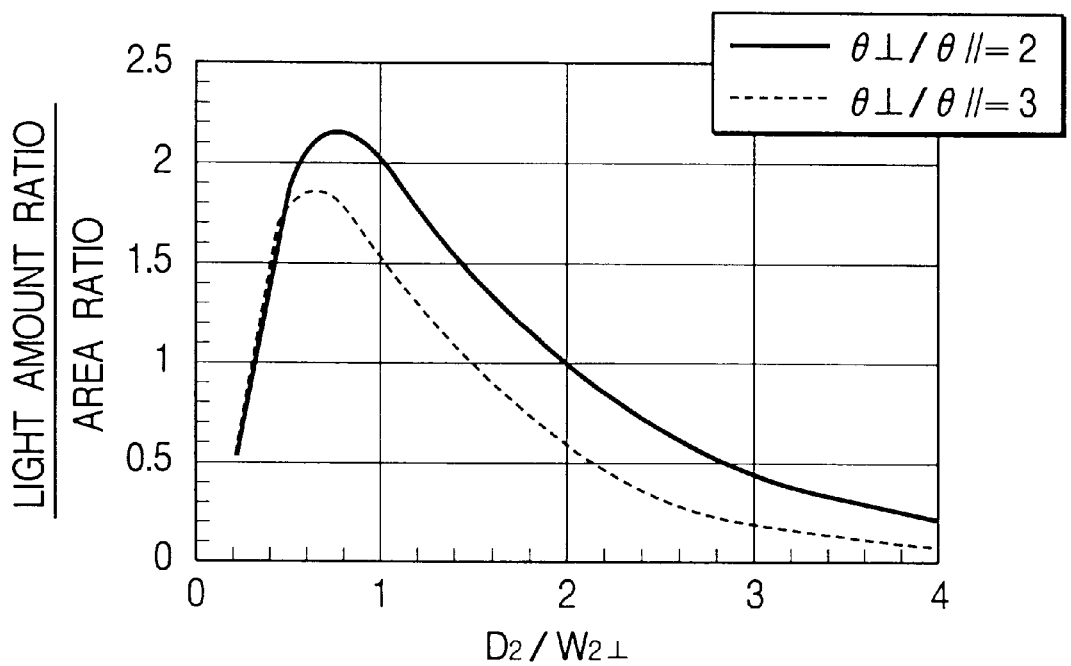
FIG. 11 is a graph showing changes in the ratio of the light amount ratio between a reproducing light spot and a heating light spot to the area ratio between the reproducing light spot and the heating light spot with changes in $D_2/W_{2\perp}$.

FIG. 11 shows the ratio of the light amount (the maximum light amount on the recording medium) ratio (based on the optical efficiency of the heating optical system obtained from FIG. 10 with the optical efficiency of the reproducing optical system being set to 30%) between the heating optical system and the reproducing optical system to the spot area ratio (obtained from FIG. 6) between the heating optical system and the reproducing optical system, provided that the output of the long-wavelength semiconductor laser 2' is 1.4 times that of the short-wavelength semiconductor laser 1' and $D_2/W_{2\perp}$ is set as a variable. Referring to FIG. 11, the solid line corresponds to $\theta'/\theta \cong 2$ (semiconductor laser 2'), and the dotted line 3; corresponds to $\theta'/\theta \cong 3$. With light amount ratio/area ratio>1.0, the heating light spot can be used as a recording light spot. That is, it suffices if $0.3 \leq D_2/W_{2\perp} \leq 2.0$, and preferably $0.3 \leq D_2/W_{2\perp} \leq 1.5$.

The spot size of a laser beam required when it is used as a heating laser beam will be described next. FIG. 4 shows the relationship between the intensity distribution of light incident on the moving (rotating) magneto-optical recording medium 6 and the temperature distribution formed thereon, when viewed from a cross section in the track direction. Referring to FIG. 4, the solid line represents the temperature distribution; and the dotted line, the intensity distribution. As is obvious from FIG. 4, the temperature distribution on the back side in the medium moving direction is similar in profile to the incident light intensity distribution. To form a temperature gradient such that the directions of atomic spins in the magnetic layer are aligned within a reproducing light spot upon movement of a magnetic wall, a reproducing light spot must fit in at least the gradient temperature distribution on the back side in the medium moving direction. With regard to the spread of the temperature distribution on the back side in the medium moving direction, it suffices if a relation of (heating light spot diameter/2)≧(reproducing light spot diameter) is substantially established. With this arrangement, a reproducing light spot can be located within the slope (gradient), of the temperature distribution obtained by a heating light spot, which is on the back side in the medium moving direction, so that the directions of atomic spins (corresponding to the magnetizing directions) in the magnetic layer which contribute to reproduction and are located within the reproducing light spot can be aligned upon movement of a magnetic wall. In this manner, the magnetic wall serving for the formation of recorded information on the magneto-optical recording medium 6 is moved by a heating light spot to enlarge the magnetic domain enclosed with the magnetic walls, thereby placing only the single magnetic domain within a reproducing light spot.

Figure 12:
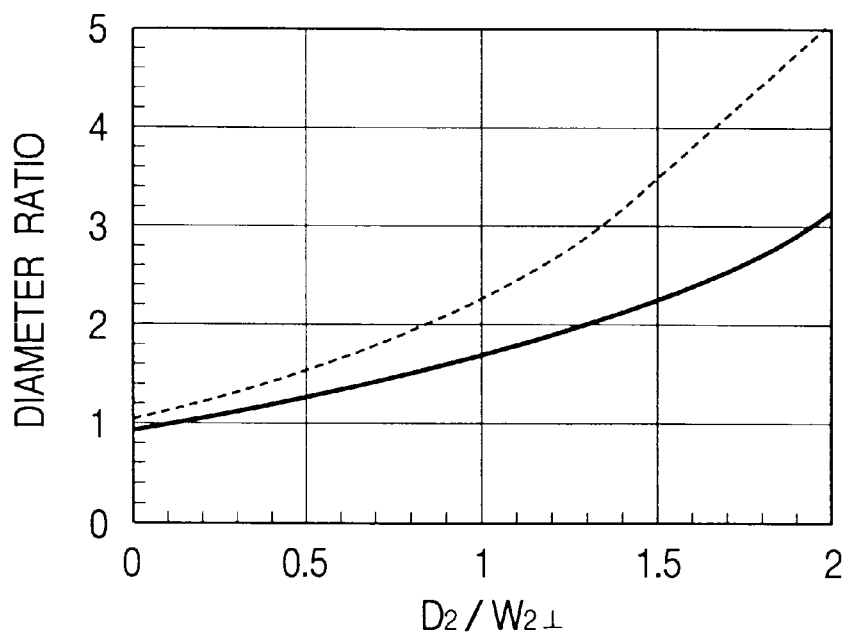
FIG. 12 is a graph showing changes in the ratio of the diameter of a heating light spot in the track crossing direction to a reproducing light spot with changes in $D_2/W_{2\perp}$.

FIG. 12 shows the diameter of a heating light spot in a direction parallel to the track direction with respect to the diameter of an isotropical reproducing light spot obtained when $D_1/W_1 \cong 0.85$. In this case, the spot diameter is indicated by the ratio of the diameter of the heating light spot to the diameter of the reproducing light spot with respect to $D_1/W_1 \cong 0.85$. Referring to FIG. 12, the solid line corresponds to $\theta'/\theta \cong 2$ (semiconductor laser 2'); the dotted line, $\theta'/\theta \cong 3$. At a spot diameter ratio of 2, $D_2/W_{2\perp} 1.0$ when $\theta'/\theta = 3$, and $D_2/W_{2\perp} \cong 1.3$ when $\theta'/\theta = 2$. No problem is therefore posed in terms of the intensity density of a heating light spot when $D_2/W_{2\perp}$ is 1.0 or more, and preferably 1.3 or more.

As is obvious from the above description, the condition for $D_2/W_{2\perp}$ for a heating light spot is $1.0 \leq D/W \leq$ about 2.0, and preferably $1.3 \leq D/W \leq$ about 1.5 because $\theta'/\theta$ of the heating semiconductor laser varies ($\theta'/\theta \cong 2$ to 3).

Figure 13:
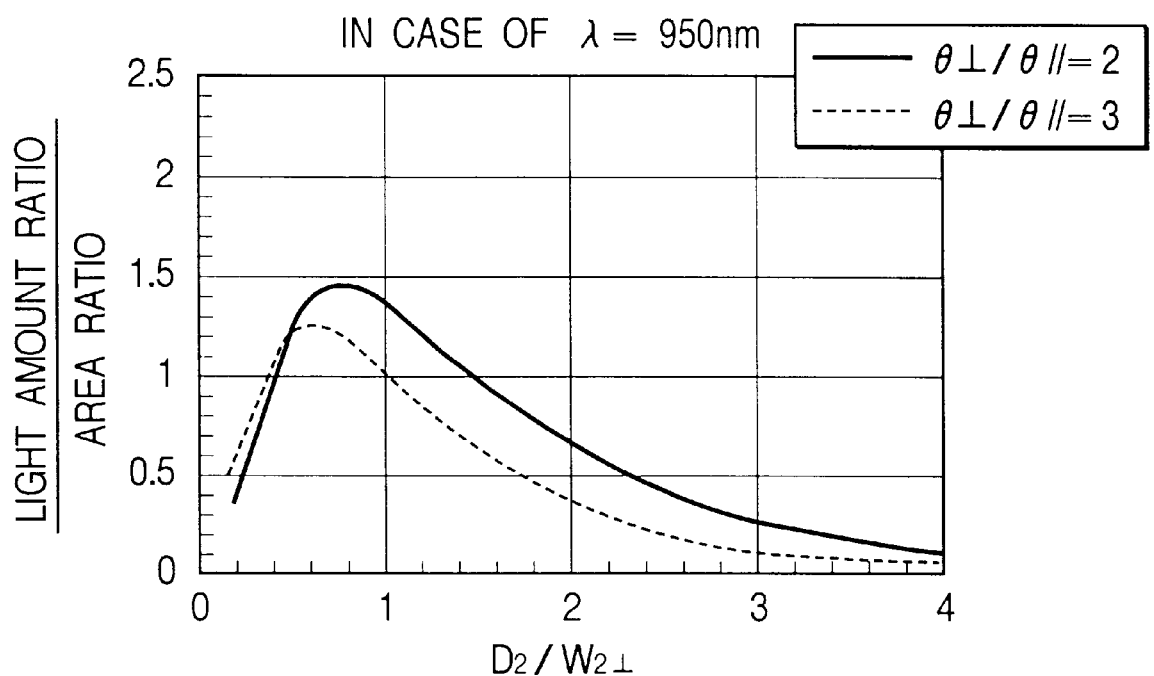
FIG. 13 is a graph showing changes in the ratio of the light amount ratio between a reproducing light spot and a heating light spot to the area ratio between the reproducing light spot and the heating light spot with changes in $D_2/W_{2\perp}$.
Figure 14:
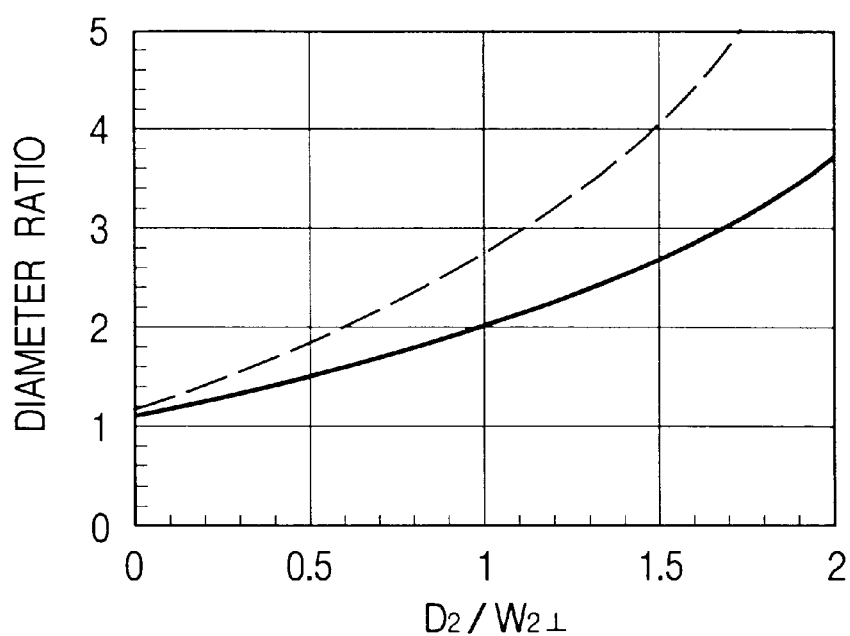
FIG. 14 is a graph showing changes in the ratio of a heating light spot in the track crossing direction to a reproducing light spot with changes in $D_2/W_{2\perp}$.
Figure 15:
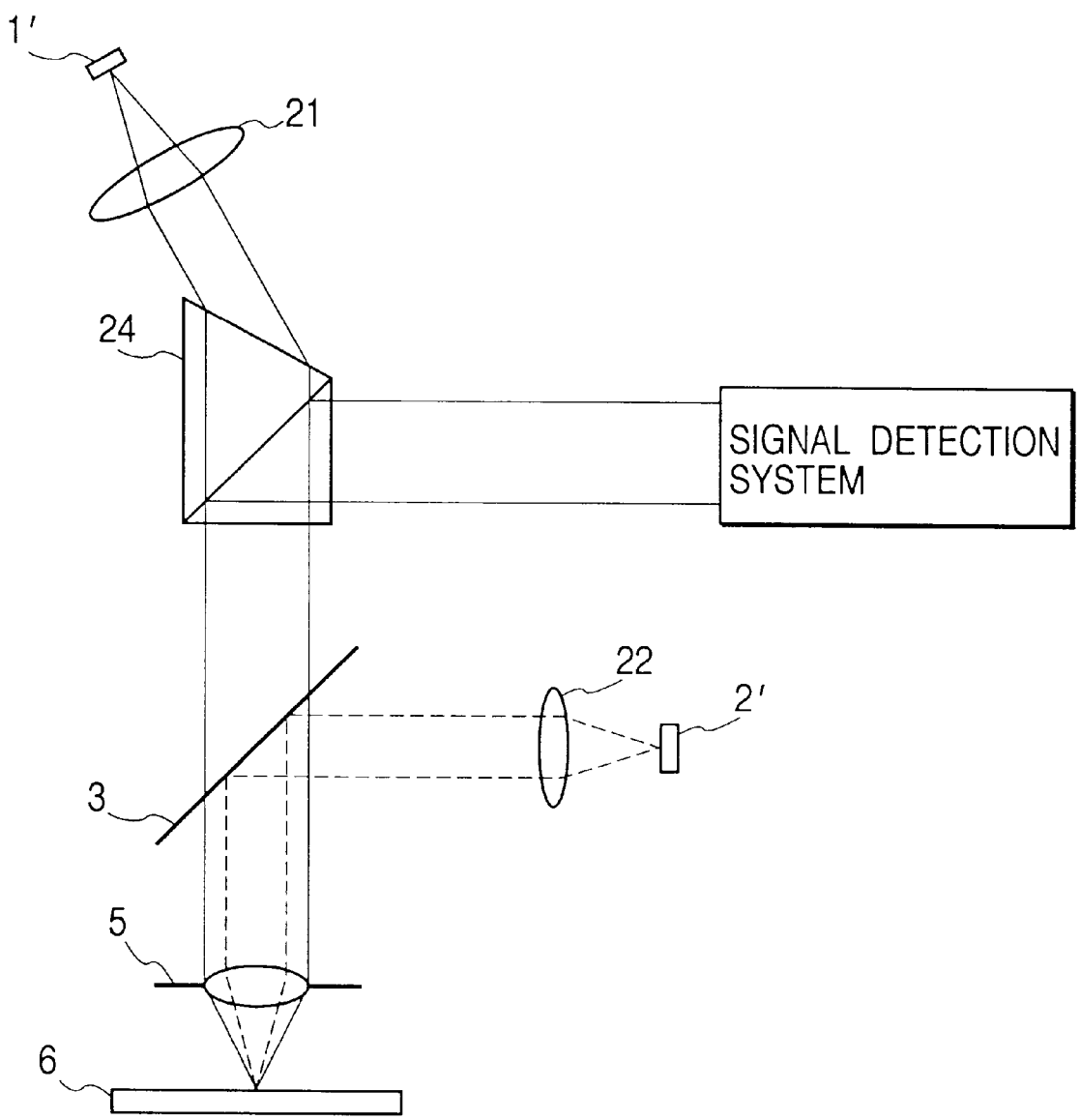
FIG. 15 is a schematic view showing the optical head optical system of an optical information recording/reproducing apparatus according to another embodiment of the present invention.

In the above description, the wavelength of the heating laser is 780 nm. When the wavelength of the heating laser is 950 nm, the graphs of FIGS. 13 and 14 correspond to those of FIGS. 11 and 12. Referring to FIGS. 13 and 14, the solid lines correspond to $\theta'/\theta \cong 2$, and the dotted lines correspond to $\theta'/\theta \cong 3$. As described above, since $\theta'/\theta$ of the semiconductor laser varies, the condition for $D_2/W_{2\perp}$ for a heating light spot is set only with respect to $D_2/W_{2\perp} \cong 1.0$. That is, the upper limit of the wavelength of the heating laser is about 950 nm. Since the upper limit of the wavelength of the reproducing laser is 680 nm and that of the heating laser 950 nm, the upper limit of the heating wavelength is 950 nm/680 nm≅1.4 times the upper limit of the reproducing wavelength (provided that the diameter of a heating light beam passing through the objective lens 5 is equal to that of a reproducing light beam passing through the objective lens 5, i.e., the NAs are equal to each other). In addition, when the aperture of the collimator lens 22 is decreased as shown in, for example, FIG. 15, the same effect as that obtained when the wavelength of light to be used is increased is obtained (the spot diameter is proportional to wavelength/NA, and to wavelength/diameter of light beam passing through object lens when the focal lengths of the objective lenses are equal to each other). According to the above description, if the wavelengths of heating and reproducing light beams are the same, the diameter of the heating light beam passing through the object lens can be reduced to about 1/1.4 times the diameter of the reproducing light beam passing through the objective lens. As in the case shown in FIG. 15 as well, if the diameter of the heating light beam (corresponding to D) passing through the objective lens is represented by $D_2$, $\alpha = (\lambda_2/\lambda_1)/(D_1/D_2)$ is about 1.4 at most.

The parameter "$D_2/W_{2\perp}$" determines the intensity distribution of a light beam captured by the objective lens (passing through the objective lens) as an argument of an exponential function. The intensity distribution of the spot formed by the objective lens is determined by the intensity distribution of the light beam captured by the objective lens, and is almost an exponential function because the Fourier transform of an exponential function is an exponential function. The factor $\alpha=(\lambda_2/\lambda_1)/(D_1/D_2)$ therefore associated with the parameter "$D_2/W_{2\perp}$" in the form of a natural logarithm having $\alpha$ as an argument. If $1.3-A\times\ln\alpha 1.5-B\times\ln\alpha=1.0$ with $\alpha=1.4$ considering $1.3 \leq D_2/W_{2\perp} \leq 1.5$ which is the condition for $D_2/W_{2\perp}$, $A \approx 0.89$ and $B \approx 1.49$.

According to the above description, letting $D_1$ be the diameter of a reproducing light beam captured by the objective lens 5, $D_2$ be the diameter of a heating light beam captured by the objective lens 5, and $W_2$ be the size of a component in the track crossing direction, of the heating light beam incident on the objective lens 5, which corresponds to $1/e^2$ the peak intensity of the heating light beam, the condition for $D_2/W_{2\perp}$ is $1.0-1.2\times\ln\alpha \leq D_2/W_2 \leq 2.0-1.49\times\ln\alpha$ preferably $1.3-0.89\times\ln\alpha \leq D_2/W_2 \leq 1.5-1.49\times\ln\alpha$ for $\alpha=(\lambda_2/\lambda_1)/(D_1/D_2)$, $\lambda_1 < \lambda_2 1.4 \times \lambda_1$ The heating laser 2' and the collimator lens 22 of the optical system in FIG. 9 were selected on the basis of the above conditions. The following are examples of the numerical values. The wavelength of the heating laser 2' is 780 nm. The focal length of the collimator lens 22 is represented by $f_{col}$.

EXAMPLE 5

$\theta=10°$ $\theta'=30°$ $f_{col}=5$ mm $D_2/W_{2\perp}=1.47$ $D_1/W_{1\perp} \cong 0.85$ optical efficiency=89% output light amount=44.5 mW spot diameter ratio in track direction=3.3 spot area ratio=4.2 light amount ratio/area ratio=10.6

EXAMPLE 6

$\theta=11°$ $\theta'=22°$ $f_{col}=5$ mm $D_2/W_{2\perp}=1.34$ $D_1/W_{1\perp} \cong 0.85$ optical efficiency=88% output light amount=44.0 mW spot diameter ratio in track direction=2.3 spot area ratio=2.6 light amount ratio/area ratio=16.9

According to Examples described above, the light amount ratio/area ratio corresponds to the recording output. In either Example 5 or Example 6, no problem is posed when heating and recording light spots are formed by using light beams from the semiconductor laser 2'. In addition, if the focal length $f_{col}$ of the collimator lens 22 is set to about 5 mm, any semiconductor laser which falls within the ranges of $\theta=10°$ to 11° and $\theta'=22°$ to 30° can be used as the semiconductor laser 2'.

According to the above characteristics, the optical efficiency of the reproducing light emitting optical system is about 51%. Since the general reproducing power is 1 to 1.5 mW, a sufficiently inexpensive, low-output semiconductor laser with a maximum rated output of about 5 mW can be used as the semiconductor laser 1' (a reproducing low-output semiconductor laser which is sufficiently lower in cost than a recording/reproducing high-output semiconductor laser for a rewritable optical disk apparatus and is used in a compact disk or laser disk reproducing apparatus can be used).

In the above embodiment, the semiconductor laser 1' and the semiconductor laser 2' are controlled by the control unit. In a reproducing operation, a heating/recording light spot is set to the heating power (at which information is not recorded or erased, but the temperature of the recording medium can be effectively raised) to heat the recording medium. Meanwhile, with a reproducing light spot, the signal detection system reads recorded information and serve information such as the tracking error and focusing error of the reproducing light spot. In a recording operation, a heating/recording light spot is set to the recording power to record information on the recording medium while the signal detection system reads, with a reproducing light spot, format information such as header information and servo information such as the tracking error and focusing error of the reproducing light spot. In the recording operation, the control unit supplies information to be recorded to the magnetic head 7 to perform magnetic field modulation recording.

As has been described above, according to the present invention, in an apparatus for reproducing a micro record mark by moving a magnetic wall using a heating light spot so as to align the directions of atomic spins in the magnetic layer within a reproducing spot, since excellent erasing/recording light spot can be formed by using a light source for a heating light spot, a light source with a sufficiently low output can be used as another light source for a reproducing light spot. An inexpensive apparatus can be realized as compared with an apparatus obtained by simply adding a heating light source to the optical system of a conventional erasable/recordable apparatus.

What is claimed is:

1. An optical information recording/reproducing apparatus for recording information on an information recording medium and/or reproducing the recorded information by irradiating a plurality of light spots on the optical information recording medium, comprising:

a first light source for emitting a first light beam with a wavelength $\lambda_1$;

a second light source for emitting a second light beam with a wavelength $\lambda_2$; and light spot forming means for focusing the first light beam and the second light beam through an objective lens, and forming first and second light spots on said information recording medium, wherein the following relations are substantially established:

$1 \geq D_1/W_{1\perp} \geq 0.6$ $3.2-2.6\times\ln\alpha \geq D_2/W_{2\perp} \geq 1.0-1.2\times\ln\alpha$ $\alpha=(\lambda_2/\lambda_1)\times(D_1/D_2)$ where $D_1$ is a diameter of the first light beam which is incident on said objective lens for formation of the first light spot, $D_2$ is a diameter of the second light beam which is incident on said objective lens for formation of the second light spot, $W_{1\perp}$ is a diameter of a component, in a direction corresponding to a track crossing direction of said information recording medium, of the first light beam incident on said objective lens and forming the first light spot, the component of the first light beam corresponding to $1/e^2$ of a peak intensity of the first light beam, and $W_{2\perp}$ is a diameter of a component, in a direction corresponding to the track crossing direction of said information recording medium, of the second light beam incident on said objective lens and forming the second light spot, the component of the second light beam corresponding to $1/e^2$ of a peak intensity of the second light beam.

2. An apparatus according to claim 1, wherein said information recording medium is a magnetic wall movement magneto-optical recording medium, and the second light spot is used to move magnetic walls associated with recorded information on said information recording medium so as to enlarge a magnetic domain enclosed with the magnetic walls and place the magnetic domain within the first light spot, thereby reproducing the recorded information with the first light spot.

3. An apparatus according to claim 1, wherein a polarizing direction of the light beam forming the second light spot optically corresponds to a track direction of said information recording medium.

4. An Apparatus according to claim 1, wherein the first light spot is used to reproduce recorded information from said information recording medium, and the second light spot is used to heat said information recording medium.

5. An apparatus according to claim 1, wherein the following relations are substantially established:

$2.4-1.9\times\ln\alpha \geq D_2/W_{2\perp} \geq 1.5-1.6\times\ln\alpha$ $\alpha=(\lambda_2/\lambda_1)\times(D_1/D_2)$.

6. An apparatus according to claim 5, wherein the first light spot is used to record/erase information on/from said information recording medium and reproduce the recorded information, and the second light spot is used to heat said information recording medium.

7. An apparatus according to claim 1, wherein $D_1 \geq D_2$.

8. An apparatus according to claim 1, wherein the light beams from said first and second light sources are synthesized by light beam separating/synthesizing means, and the synthesized light is focused by said objective lens.

9. An apparatus according to claim 8, wherein a wavelength of the light beam from said first light source differs from a wavelength of the light beam from said second light source, and said light beam separating/synthesizing means is a dichromic mirror.

10. An apparatus according to claim 8, further comprising a first collimator lens disposed between said second light source and said light beam separating/synthesizing means.

11. An apparatus according to claim 8, further comprising a polarizing beam splitter disposed between said first light source and said light beam separating/synthesizing means, and wherein a reflected light beam from the first light spot is separated from said first light source by said polarizing beam splitter to be guided to a signal detection system.

12. An apparatus according to claim 11, further comprising a second collimator lens disposed between said first light source and said polarizing beam splitter.

13. An apparatus according to claim 1, wherein said first and second light sources are semiconductor lasers.

14. An apparatus according to claim 1, wherein a far field pattern of said second light source has a shape elongated in a direction corresponding to the track crossing direction of said information recording medium.

15. An apparatus according to claim 1, wherein a relation of $\lambda_1<\lambda_2<1.4\times\lambda_1$ is further established.

16. An apparatus according to claim 1, wherein the following relations are substantially established:

$2.0-1.49\times\ln\alpha \geq D_2/W_{2\perp} \geq 1.0-1.2\times\ln\alpha$ $\alpha=(\lambda_2/\lambda_1)\times(D_1/D_2)$.

17. An apparatus according to claim 16, wherein the following relations are substantially established:

$1.5-1.49\times\ln\alpha \geq D_2/W_{2\perp} \geq 1.3-0.89\times\ln\alpha$ $\alpha=(\lambda_2/\lambda_1)\times(D_1/D_2)$.

18. An apparatus according to claim 16, wherein the first light spot is used to reproduce recorded information from said information recording medium, and the second light spot is used to record/erase information on/from said information recording medium and heat said information recording medium.

19. An apparatus according to claim 18, wherein when information is to be recorded/erased on/from said information recording medium by using the second light spot, the first light spot is used to read format information and servo information about the first light spot.

20. An apparatus according to claim 18, wherein when recorded information is to be reproduced from said information recording medium by using the first light spot, the first light spot is used to read servo information about the first light spot.

* * * * *

UNITED STATES PATENT AND TRADEMARK OFFICE
CERTIFICATE OF CORRECTION

PATENT NO.   : 6,031,810
DATED        : February 29, 2000
INVENTOR(S)  : Koichiro Nishikawa It is certified that error appears in the above-identified patent and that said Letters Patent is hereby corrected as shown below:

Title Page:

Item [57] Abstract
Line 23, "corresponds" should read -- correspond --.
Line 24, "$1/e^2$ should read -- $1/e^2$ of --.

Column 3
Line 44, "$\propto = (\zeta_2/\lambda_1)$" should read -- $\propto = (\lambda_2/\lambda_1)$ --.

Column 6
Line 23, "dichromic" should read -- dichroic --.
Line 28, "100% of reflect" should read -- reflect 100% of --.
Line 33, "dichromic" should read -- dichroic --.
Line 64, "distribution;" should read -- distribution, --.

Column 7
Line 35, "component," should read -- component --.
Line 37, "$1/e^2$" should read -- $1/e^2$ of --.
Line 50, "$1/e^2$" should read -- $1/e^2$ of --.

Column 9
Line 14, "$1/e^2$" should read -- $1/e^2$ of --.
Line 20, "dichromic" should read -- dichroic --.

Column 10
Line 17, "Not" should read -- Note --.
Line 32, "$D_2/W_2$," should read -- $D_2/W_2 \perp$ --.

Column 11
Line 49, "dichromic" should read -- dichroic --.

Column 12
Line 24, "$1/e^2$" should read -- $1/e^2$ of --.
Line 51, "$1/e^2$" should read -- $1/e^2$ of --.
Line 63, "$1/e^2$" should read -- $1/e^2$ of --.

UNITED STATES PATENT AND TRADEMARK OFFICE
CERTIFICATE OF CORRECTION

PATENT NO. : 6,031,810
DATED : February 29, 2000
INVENTOR(S) : Koichiro Nishikawa It is certified that error appears in the above-identified patent and that said Letters Patent is hereby corrected as shown below:

Column 14,
Line 24, "$D_2/W_2 1 \perp .0$" should read -- $D_2/W_2 \perp \cong 1.0$ --.

Column 17
Line 22, "Apparatus" should read -- apparatus --.
Line 47, "dichromic" should read -- dichroic --.

Signed and Sealed this

Twenty-first Day of August, 2001

*Attest:*

Nicholas P. Godici

NICHOLAS P. GODICI
*Attesting Officer*    *Acting Director of the United States Patent and Trademark Office*